United States Patent
Zhang et al.

(10) Patent No.: US 10,791,490 B2
(45) Date of Patent: *Sep. 29, 2020

(54) SUPPORTING ENHANCED UPLINK TRANSMISSION DURING SOFT HANDOVER

(71) Applicant: Signal Trust for Wireless Innovation, Wilmington, DE (US)

(72) Inventors: Guodong Zhang, Syosset, NY (US); Sung-Hyuk Shin, Northvale, NJ (US); Stephen E. Terry, Northport, NY (US); James M. Miller, Verona, NJ (US); Stephen G. Dick, Nesconset, NY (US)

(73) Assignee: Signal Trust for Wireless Innovation, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/283,407

(22) Filed: Feb. 22, 2019

(65) Prior Publication Data
US 2019/0191350 A1   Jun. 20, 2019

Related U.S. Application Data

(63) Continuation of application No. 15/699,418, filed on Sep. 8, 2017, now Pat. No. 10,219,196, which is a (Continued)

(51) Int. Cl.
*H04W 36/18*   (2009.01)
*H04L 1/18*   (2006.01)
(Continued)

(52) U.S. Cl.
CPC .......... *H04W 36/18* (2013.01); *H04L 1/1812* (2013.01); *H04L 1/1887* (2013.01);
(Continued)

(58) Field of Classification Search
None
See application file for complete search history.

(56) References Cited

U.S. PATENT DOCUMENTS

| 5,628,631 A | 5/1997 | Aneha |
| 5,794,149 A | 8/1998 | Hoo |
| (Continued) | | |

FOREIGN PATENT DOCUMENTS

| DE | 10225428 | 12/2003 |
| EP | 0 977 393 | 2/2000 |
| (Continued) | | |

OTHER PUBLICATIONS

"Hybrid ARQ text proposal for Section 7 of TR25.896" TSG-RAN WG1 #31, R1-030208, Tokyo, Japan, Feb. 18-21, 2002, 4 pages.
(Continued)

*Primary Examiner* — Brian S Roberts
(74) *Attorney, Agent, or Firm* — Volpe and Koenig, P.C.

(57) ABSTRACT

An enhanced uplink user equipment is in soft handover. A radio network controller selects a primary Node-B out of a plurality of Node-Bs supporting the soft handover. The radio network controller receiving successfully received enhanced uplink data packets from the plurality of Node-Bs. The radio network controller reordered the successfully received enhanced uplink data packets for in-sequence deliver. The primary Node-B sends specified scheduling information to the user equipment that the other Node-Bs does not transmit. At least the primary Node-B transmits acknowledgements and negative acknowledgements to the user equipment.

43 Claims, 4 Drawing Sheets

Related U.S. Application Data continuation of application No. 14/869,313, filed on Sep. 29, 2015, now Pat. No. 9,763,156, which is a continuation of application No. 13/908,242, filed on Jun. 3, 2013, now Pat. No. 9,215,636, which is a continuation of application No. 13/308,950, filed on Dec. 1, 2011, now Pat. No. 8,457,072, which is a continuation of application No. 11/434,330, filed on May 15, 2006, now Pat. No. 8,130,720, which is a continuation of application No. 10/962,720, filed on Oct. 12, 2004, now Pat. No. 7,046,648.

(60) Provisional application No. 60/578,674, filed on Jun. 10, 2004, provisional application No. 60/520,692, filed on Nov. 17, 2003, provisional application No. 60/519,990, filed on Nov. 14, 2003, provisional application No. 60/517,656, filed on Nov. 5, 2003.

(51) Int. Cl.
*H04W 74/00* (2009.01)
*H04W 74/04* (2009.01)
*H04B 7/022* (2017.01)
*H04W 36/30* (2009.01)
*H04W 88/08* (2009.01)

(52) U.S. Cl.
CPC ......... *H04L 1/1893* (2013.01); *H04W 74/004* (2013.01); *H04W 74/04* (2013.01); *H04B 7/022* (2013.01); *H04W 36/30* (2013.01); *H04W 88/08* (2013.01)

(56) References Cited

U.S. PATENT DOCUMENTS

| | | |
|---|---|---|
| 5,933,787 A | 8/1999 | Gilhousen et al. |
| 5,946,320 A | 8/1999 | Decker et al. |
| 6,434,396 B1 | 8/2002 | Rune |
| 6,507,567 B1 | 1/2003 | Willars |
| 6,628,631 B1 | 9/2003 | Mazawa et al. |
| 6,643,813 B1 | 11/2003 | Johansson et al. |
| 6,650,905 B1 | 11/2003 | Toskala et al. |
| 6,678,249 B2 | 1/2004 | Toskala et al. |
| 6,678,523 B1 | 1/2004 | Ghosh et al. |
| 6,690,939 B1 | 2/2004 | Jonsson et al. |
| 6,754,496 B2 | 6/2004 | Mohebbi et al. |
| 6,778,830 B1 | 8/2004 | Oizumi et al. |
| 6,829,482 B2 | 12/2004 | Rune et al. |
| 6,850,771 B2 | 2/2005 | Malladi et al. |
| 6,892,071 B2 | 5/2005 | Park et al. |
| 6,907,245 B2 | 6/2005 | Ohlsson et al. |
| 6,915,465 B2 | 7/2005 | Fujiwara et al. |
| 6,977,888 B1 | 12/2005 | Frenger et al. |
| 7,013,143 B2 | 3/2006 | Love et al. |
| 7,026,911 B2 | 4/2006 | Aono et al. |
| 7,046,648 B2 | 5/2006 | Zhang et al. |
| 7,054,633 B2 | 5/2006 | Seo et al. |
| 7,065,359 B2 | 6/2006 | Chuah et al. |
| 7,103,729 B2 | 9/2006 | Altahan et al. |
| 7,124,350 B2 | 10/2006 | Chao et al. |
| 7,158,504 B2 | 1/2007 | Kadaba et al. |
| 7,185,256 B2 | 2/2007 | Miki et al. |
| 7,206,598 B2 | 4/2007 | Attar et al. |
| 7,266,384 B2 | 9/2007 | Kim et al. |
| 7,269,420 B2 | 9/2007 | Heo et al. |
| 7,277,407 B2 | 10/2007 | Kim et al. |
| 7,283,508 B2 | 10/2007 | Choi et al. |
| 7,283,509 B2 | 10/2007 | Moon et al. |
| 7,283,515 B2 | 10/2007 | Sinnarajah et al. |
| 7,315,741 B2 | 1/2008 | Chun |
| 7,317,700 B2 | 1/2008 | Hwang |
| 7,346,035 B2 | 3/2008 | Lee et al. |
| 7,366,538 B2 | 4/2008 | Seki et al. |
| 7,372,898 B2 | 5/2008 | Shin et al. |
| 7,403,513 B2 | 7/2008 | Lee et al. |
| 7,414,989 B2 | 8/2008 | Kuchibhotla et al. |
| 7,428,424 B2 | 9/2008 | Hwang et al. |
| 7,433,337 B2 | 10/2008 | Chao et al. |
| 7,519,016 B2 | 4/2009 | Lee et al. |
| 7,558,230 B2 | 7/2009 | Lee et al. |
| 7,606,205 B2 | 10/2009 | Ranta-Aho et al. |
| 7,848,290 B2 | 12/2010 | Cheng et al. |
| 7,903,610 B2 | 3/2011 | Cheng et al. |
| 7,974,630 B1 | 7/2011 | Haumont et al. |
| 8,023,463 B2 | 9/2011 | Dick et al. |
| 8,682,325 B1 | 3/2014 | Cooper |
| 9,438,381 B2 | 9/2016 | Dick et al. |
| 10,219,196 B2 * | 2/2019 | Zhang ................. H04W 74/004 |
| 10,390,279 B2 | 8/2019 | Dick et al. |
| 2001/0020285 A1 | 9/2001 | Fujiwara et al. |
| 2002/0093937 A1 | 7/2002 | Kim et al. |
| 2002/0095635 A1 | 7/2002 | Wager et al. |
| 2002/0115460 A1 | 8/2002 | Rune et al. |
| 2002/0115467 A1 | 8/2002 | Hamabe |
| 2002/0172208 A1 | 11/2002 | Malkamaki |
| 2002/0191544 A1 | 12/2002 | Cheng et al. |
| 2003/0002470 A1 | 1/2003 | Park et al. |
| 2003/0007480 A1 | 1/2003 | Kim et al. |
| 2003/0031119 A1 | 2/2003 | Kim et al. |
| 2003/0043786 A1 | 3/2003 | Kall et al. |
| 2003/0054824 A1 | 3/2003 | Choi et al. |
| 2003/0081692 A1 | 5/2003 | Kwan et al. |
| 2003/0123470 A1 | 7/2003 | Kim et al. |
| 2003/0131124 A1 | 7/2003 | Yi et al. |
| 2003/0147370 A1 | 8/2003 | Wu |
| 2003/0161284 A1 | 8/2003 | Chen |
| 2003/0171118 A1 | 9/2003 | Miya |
| 2003/0176195 A1 | 9/2003 | Dick et al. |
| 2003/0202500 A1 | 10/2003 | Ha et al. |
| 2003/0210668 A1 | 11/2003 | Malladi et al. |
| 2004/0004954 A1 | 1/2004 | Terry et al. |
| 2004/0072567 A1 | 4/2004 | Cao et al. |
| 2004/0085934 A1 | 5/2004 | Balachandran et al. |
| 2004/0120306 A1 | 6/2004 | Wigard et al. |
| 2004/0160925 A1 | 8/2004 | Heo et al. |
| 2004/0202129 A1 | 10/2004 | Kolding et al. |
| 2004/0203991 A1 | 10/2004 | Chen et al. |
| 2004/0219917 A1 | 11/2004 | Love et al. |
| 2004/0219919 A1 | 11/2004 | Whinnett et al. |
| 2004/0219920 A1 | 11/2004 | Love et al. |
| 2004/0228313 A1 | 11/2004 | Cheng et al. |
| 2005/0041694 A1 | 2/2005 | Liu |
| 2005/0047354 A1 | 3/2005 | Zeira et al. |
| 2005/0048920 A1 | 3/2005 | Liu |
| 2005/0083888 A1 | 4/2005 | Smee et al. |
| 2005/0207374 A1 | 9/2005 | Petrovic et al. |
| 2006/0045010 A1 | 3/2006 | Baker et al. |
| 2006/0105796 A1 | 5/2006 | Malladi et al. |
| 2006/0274712 A1 | 12/2006 | Malladi et al. |
| 2007/0047501 A1 | 3/2007 | Usuda et al. |
| 2007/0079207 A1 | 4/2007 | Seidel et al. |

FOREIGN PATENT DOCUMENTS

| | | |
|---|---|---|
| EP | 1 217 777 | 6/2002 |
| GB | 2 353 439 | 2/2001 |
| JP | 04-157821 | 5/1992 |
| JP | 2000-217139 | 8/2000 |
| JP | 2001-8251 | 1/2001 |
| JP | 2001-128209 | 5/2001 |
| JP | 2002-009741 | 1/2002 |
| JP | 2003-134180 | 5/2003 |
| JP | 2003-163960 | 6/2003 |
| JP | 2007-511135 | 4/2007 |
| KR | 20020095231 | 12/2002 |
| KR | 20030003943 | 1/2003 |
| KR | 20030040972 | 5/2003 |
| RU | 2003112283 | 12/2005 |
| RU | 2005110767 | 10/2006 |
| TW | 536896 | 6/2003 |
| TW | 200303689 | 9/2003 |
| WO | 99/027740 | 6/1999 |
| WO | 00/35226 | 6/2000 |

(56) References Cited

FOREIGN PATENT DOCUMENTS

| | | |
|---|---|---|
| WO | 00/074263 | 12/2000 |
| WO | 02/01893 | 1/2002 |
| WO | 02/37572 | 5/2002 |
| WO | 02/037872 | 5/2002 |
| WO | 02/047317 | 6/2002 |
| WO | 02/082108 | 10/2002 |
| WO | 02/101966 | 12/2002 |
| WO | 02/102109 | 12/2002 |
| WO | 03/003643 | 1/2003 |
| WO | 03/026231 | 3/2003 |
| WO | 03/037027 | 5/2003 |
| WO | 03/047155 | 6/2003 |
| WO | 03/053087 | 6/2003 |
| WO | 03/067953 | 8/2003 |
| WO | 03/088545 | 10/2003 |
| WO | 2005/048503 | 5/2005 |

OTHER PUBLICATIONS

3GPP TSG RAN WG1 #31, Tdoc R1-03-0273, Qualcomm, "Channel Structure for Consideration in Enhanced Uplink", Tokyo, Japan, Feb. 18-21, 2003.
3GPP, "3rd Generation Partnership Project; Technical Specification Group Radio Access Network; Feasibility Study for Enhanced Uplink for UTRA FDD; (Release 6)," 3GPP TR 25.896 V1.0.2 (Oct. 2003).
3GPP, "3rd Generation Partnership Project; Technical Specification Group Radio Access Network; Feasibility Study for Enhanced Uplink for UTRA FDD (Release 6)," 3GPP TR 25.896 V6.0.0 (Mar. 2004).
3GPP, "3rd Generation Partnership Project; Technical Specification Group Radio Access Network; Multiplexing and channel coding (FDD) (Release 1999)," 3GPP TS 25.212 V3.11.0 (Sep. 2002).
3GPP, "3rd Generation Partnership Project; Technical Specification Group Radio Access Network; Medium Access Control (MAC) protocol specification (Release 1999)." 3GPP TS 25.321 V3.16.0 (Sep. 2003).
3GPP, "3rd Generation Partnership Project; Technical Specification Group Radio Access Network; Multiplexing and channel coding (FDD) (Release 4)," 3GPP TS 25.212 V4.6.0 (Sep. 2002).
3GPP, "3rd Generation Partnership Project; Technical Specification Group Radio Access Network; Multiplexing and channel coding (FDD) (Release 5)," 3GPP TS 25.212 V5.6.0 (Sep. 2003).
3GPP, "3rd Generation Partnership Project; Technical Specification Group Radio Access Network; Multiplexing and channel coding (FDD) (Release 5)," 3GPP TS 25.212 V5.9.0 (Jun. 2004).
3GPP, "3rd Generation Partnership Project; Technical Specification Group Radio Access Network; Multiplexing and channel coding (FDD) (Release 6)," 3GPP TS 25.212 V6.2.0 (Jun. 2004).
3GPP, "3rd Generation Partnership Project; Technical Specification Group Radio Access Network; Medium Access Control (MAC) protocol specification (Release 1999)," 3GPP TS 25.321 V3.17.0 (Jun. 2004).
3GPP, "3rd Generation Partnership Project; Technical Specification Group Radio Access Network; Medium Access Control (MAC) protocol specification (Release 6)," 3GPP TS 25.321 V6.2.0 (Jun. 2004).
3GPP, "3rd Generation Partnership Project; Technical Specification Group Radio Access Network; Medium Access Control (MAC) protocol specification (Release 4)," 3GPP TS 25.321 V4.9.0 (Sep. 2003).
3GPP, "3rd Generation Partnership Project; Technical Specification Group Radio Access Network; Medium Access Control (MAC) protocol specification (Release 5)," 3GPP TS 25.321 V5.9.0 (Jun. 2004).
3GPP, "3rd Generation Partnership Project; Technical Specification Group Radio Access Network; Medium Access Control (MAC) protocol specification (Release 4)," 3GPP TS 25.321 V4.10.0 (Jun. 2004).
3GPP, "3rd Generation Partnership Project; Technical Specification Group Radio Access Network; Medium Access Control (MAC) protocol specification (Release 5)," 3GPP TS 25.321 V5.6.0 (Sep. 2003).
3GPP, "3rd Generation Partnership Project; Technical Specification Group Radio Access Network; Feasibility Study for Enhanced Uplink for UTRA FDD; (Release 6)," 3GPP TR 25.896 V1.0.1 (Oct. 2003).
3GPP, "3rd Generation Partnership Project; Technical Specification Group Radio Access Network; Radio Resource Control (RRC) protocol specification (Release 1999)," 3GPP TS 25.331 V3.16.0 (Sep. 2003).
3GPP, "3rd Generation Partnership Project; Technical Specification Group Radio Access Network; Radio Resource Control (RRC) protocol specification (Release 1999)," 3GPP TS 25.331 V3.20.0 (Sep. 2004).
3GPP, "3rd Generation Partnership Project; Technical Specification Group Radio Access Network; Radio Resource Control (RRC); Protocol Specification (Release 4)," 3GPP TS 25.331 V4.11.0 (Sep. 2003).
3GPP, "3rd Generation Partnership Project; Technical Specification Group Radio Access Network; Radio Resource Control (RRC); Protocol Specification (Release 4)," 3GPP TS 25.331 V4.15.0 (Jun. 2004).
3GPP, "3rd Generation Partnership Project; Technical Specification Group Radio Access Network; Radio Resource Control (RRC); Protocol Specification (Release 5)," 3GPP TS 25.331 V5.6.0 (Sep. 2003).
3GPP, "3rd Generation Partnership Project; Technical Specification Group Radio Access Network; Radio Resource Control (RRC); Protocol Specification (Release 5)," 3GPP TS 25.331 V5.10.0 (Sep. 2004).
3GPP, "3rd Generation Partnership Project; Technical Specification Group Radio Access Network; Radio Resource Control (RRC); Protocol Specification (Release 6)," 3GPP TS 25.331 V6.3.0 (Sep. 2004).
3GPP, "3rd Generation Partnership Project; Technical Specification Group Radio Access Network; UTRAN lub interface NBAP signaling (Release 1999)," 3GPP TS 25.433 V3.14.2 (Sep. 2004).
3GPP, "3rd Generation Partnership Project; Technical Specification Group Radio Access Network; UTRAN lub interface NBAP signaling (Release 1999)," 3GPP TS 25.433 V3.14.0 (Sep. 2003).
3GPP, "3rd Generation Partnership Project; Technical Specification Group Radio Access Network; UTRAN lub interface NBAP signaling (Release 4)," 3GPP TS 25.433 V4.10.0 (Sep. 2003).
3GPP, "3rd Generation Partnership Project; Technical Specification Group Radio Access Network; UTRAN lub interface NBAP signaling (Release 4)," 3GPP TS 25.433 V4.13.0 (Sep. 2004).
3GPP, "3rd Generation Partnership Project; Technical Specification Group Radio Access Network; UTRAN lub interface NBAP signaling (Release 5)," 3GPP TS 25.433 V5.6.0 (Sep. 2003).
3GPP, "3rd Generation Partnership Project; Technical Specification Group Radio Access Network; UTRAN lub interface NBAP signaling (Release 5)," 3GPP TS 25.433 V5.10.0 (Sep. 2004).
3GPP, "3rd Generation Partnership Project; Technical Specification Group Radio Access Network; UTRAN lub interface NBAP signaling (Release 6)," 3GPP TS 25.433 V6.3.0 (Sep. 2004).
3GPP, "Third Generation Partnership Project; Technical Specification Group Radio Access Network; FDD Enhanced Uplink; Overall Description; Stage 2 (Release 6)," 3GPP TS 25.309 V6.0.0 (Sep. 2004).
3GPP2 C.20003-C, "Medium Access Control (MAC) Standard for cdma2000 Spread Spectrum Systems", $3^{rd}$ Generation Partnership Project 2 "3GPP2", Version 2.0, Release C, Aug. 2004.
3GPP2 C.S0004-C, "Signaling Link Access Control (LAC) Standard for cdma2000 Spread Spectrum Systems", $3^{rd}$ Generation Partnership Project 2 "3GPP2", Version 2.0, Revision C, Jul. 23, 2004.
3GPP2 C.S0005-C, "Upper Layer (Layer 3) Signaling Standard for cdma2000 Spread Spectrum Systems", $3^{rd}$ Generation Partnership Project 2 "3GPP2", Version 2.0, Revision c, Jul. 23, 2004.
ETSI, UMTS XX. 15 V0.3.0 Jan. 1999, UTRA Handover, 21 pp.

(56) References Cited

OTHER PUBLICATIONS

GPP2 C.S0002-C, "Physical Layer Standard for cdma2000 Spread Spectrum Systems", 3$^{rd}$ Generation Partnership Project 2 "3GPP2", Version 2.0, Revision C, Jul. 23, 2004.
Heck et al., "Diversity Effects on the Soft Handover Gain in UMTS Networks," Proceedings of the IEEE Vehicular Technology Conference, vol. 2, pp. 1269-1273 (Sep. 2002).
Interdigital, "Performance Analysis of HARQ in Soft Handover," 3GPP TSG-RAN WG1 #34 meeting, R1-030979 (Oct. 6-10, 2003).
Nokia, "HARQ overhead issues", TSG-RAN1 #33, R1-030733 (Aug. 25-29, 2003).
Panasonic, "HARQ operation during Soft Handover," 3GPP TSG-RAN WG1 Meeting #33, R1-030802, New York, USA (Aug. 25-29, 2003).
Panasonic, HARQ Operation During Soft Handover, 3GPP TSG-RAN WG1 Meeting #33 R1-030802, Aug. 25-29, 2003.
Qualcomm, "Impact of Downlink Support Channels," 3GPP TSG RAN WG1 #32, Tdoc R1-03-0433, Paris, France (May 19-23, 2003).
R1-030803, "HARQ operation during Soft Handover", Panasonic, TSG RAN1 #33.
Samsung, "HARQ performance in soft handover", TSG RAN1 #33, R1-030765 (Aug. 25-29, 2003).
Samsung, "HARQ Structure", 3GPP TSG-RAN WG1 #31, R1-030247, Tokyo, Japan, 3 pages (Feb. 18-21, 2003).
Samsung, "Transport channel multiplexing options considering SHO", 3GPP TSG RAN WG1 #33, R1-030767, New York, USA, 5 pages (Aug. 25-29, 2003).
Third Generation Partnership Project, "Technical Specification Group Radio Access Network; Feasibility Study for Enhanced Uplink for UTRA FDD; (Release 6," 3GPP TR 25.896 V0.4.2 (R1-030952) (Sep. 2003).
Third Generation Partnership Project, "Technical Specification Group Radio Access Network; Requirements for support of radio resource management (FDD) (Release 1999)," 3GPP TS 25.133 V3.19.0 (Sep. 2004).
Third Generation Partnership Project, "Technical Specification Group Radio Access Network; Requirements for support of radio resource management (FDD) (Release 4)," 3GPP TS 25.133 V4.10.0 (Sep. 2003).
Third Generation Partnership Project, "Technical Specification Group Radio Access Network; Requirements for support of radio resource management (FDD) (Release 4)," 3GPP TS 25.133 V4.13.0 (Sep. 2004).
Third Generation Partnership Project, "Technical Specification Group Radio Access Network; Requirements for support of radio resource management (FDD) (Release 5)," 3GPP TS 25.133 V5.12.0 (Sep. 2004).
Third Generation Partnership Project, "Technical Specification Group Radio Access Network; Requirements for support of radio resource management (FDD) (Release 6)," 3GPP TS 25.133 V6.7.0 (Sep. 2004).
Third Generation Partnership Project, "Technical Specification Group Radio Access Network; Requirements for support of radio resource management (FDD) (Release 1999)," 3GPP TS 25.133 V3.15.0 (Sep. 2003).
Third Generation Partnership Project, "Technical Specification Group Radio Access Network; Requirements for support of radio resource management (FDD) (Release 5)," 3GPP TS 25.133 V5.8.0 (Sep. 2003).
Third Generation Partnership Project, "Technical Specification Group Radio Access Network; Requirements for support of radio resource management (FDD) (Release 6)," 3GPP TS 25.133 V6.3.0 (Sep. 2003).
Third Generation Partnership Project, Technical Specification Group Radio Access Network; Feasibility Study for Enhanced Uplink for UTRA FDD (Release 6), 3GPP TR 25.896 V0.2.1, R1-030372, pp. 14-17 (Feb. 26, 2003).
Third Generation Partnership Project, "Technical Specification Group Radio Access Network; Physical layer procedures (FDD) (Release 1999)," 3GPP TS 25.214 V3.12.0 (Mar. 2003).
Third Generation Partnership Project, "Technical Specification Group Radio Access Network; Physical layer procedures (FDD) (Release 4)," 3GPP TS 25.214 V4.6.0 (Mar. 2003).
Third Generation Partnership Project, "Technical Specification Group Radio Access Network; Physical layer procedures (FDD) (Release 5)," 3GPP TS 25.214 V5.6.0 (Sep. 2003).
Third Generation Partnership Project, "Technical Specification Group Radio Access Network; Physical layer procedures (FDD) (Release 5)," 3GPP TS 25.214 V5.9.0 (Jun. 2004).
Third Generation Partnership Project, "Technical Specification Group Radio Access Network; Physical channels and mapping of transport channels onto physical channels (FDD) (Release 1999)," 3GPP TS 25.211 V3.12.0 (Sep. 2002).
Third Generation Partnership Project, "Technical Specification Group Radio Access Network; Physical channels and mapping of transport channels onto physical channels (FDD) (Release 4)," 3GPP TS 25.211 V4.6.0 (Sep. 2002).
Third Generation Partnership Project, "Technical Specification Group Radio Access Network; Physical channels and mapping of transport channels onto physical channels (FDD) (Release 5)," 3GPP TS 25.211 V5.5.0 (Sep. 2003).
Third Generation Partnership Project, "Technical Specification Group Radio Access Network; Physical channels and mapping of transport channels onto physical channels (FDD) (Release 5)," 3GPP TS 25.211 V5.6.0 (Sep. 2004).
Third Generation Partnership Project, "Technical Specification Group Radio Access Network; Physical channels and mapping of transport channels onto physical channels (FDD) (Release 6)," 3GPP TS 25.211 V6.2.0 (Sep. 2004).
Third Generation Partnership Project, "Technical Specification Group Radio Access Network; Physical layer procedures (FDD) (Release 6)," 3GPP TS 25.214 V6.3.0 (Sep. 2004).
Third Generation Partnership Project, "Technical Specification Group Radio Access Network; High Speed Downlink Packet Access (HSDPA); Overall description; Stage 2 (Release 6)," 3GPP TS 25.308 V6.2.0 (Sep. 2004).
Third Generation Partnership Project, "Technical Specification Group Radio Access Network; High Speed Downlink Packet Access (HSDPA); Overall description; Stage 2 (Release 5)," 3GPP TS 25.308 V5.6.0 (Sep. 2004).
Third Generation Partnership Project, "Technical Specification Group Radio Access Network; High Speed Downlink Packet Access (HSDPA); Overall description; Stage 2 (Release 5)," 3GPP TS 25.308 V5.4.0 (Mar. 2003).
TSGR1#3(99)187, "Improvements to Site Selection Delivery Transmission (SSDT)", TSG-RAN Working Group 1 meeting #3, Source: Motorola, Stockholm, Sweden, 5 pages (Mar. 22-26, 1999). ftp://www.3gpp.org/tsg_ran/WG1_RL1/TSGR1_03/Docs/pdfs/R1-99187.PDF.
Ericsson, "E-DCH multiplexing and transport channel structure," TSG-RAN Working Group 2 meeting #42, Tdoc R2-040917, Montreal, Canada, (May 2004).
Holma et al., "WCDMA for UMTS—Radio Access for Third Generation Mobile Communications," First Edition, (2000).
Third Generation Partnership Project, "Technical Specification Group Radio Access Network, FDD Enhanced Uplink, Overall description, Stage 2 (Release 6)," 3GPP TS 25.309 V0.2.0 (Jun. 2004).
3GPP, "3rd Generation Partnership Project; Technical Specification Group Radio Access Network; UTRAN lub Interface User Plane Protocols for Common Transport Channel data streams (Release 5)," 3GPP TS 25.435 V5.5.0 (Jun. 2003).
3GPP, "3rd Generation Partnership Project; Technical Specification Group Radio Access Network; UTRAN lub Interface User Plane Protocols for Common Transport Channel data streams (Release 6)," 3GPP TS 25.435 V6.1.0 (Mar. 2004).
3GPP, "3rd Generation Partnership Project; Technical Specification Group Radio Access Network; Radio resource management strategies (Release 5)," 3GPP TR 25.922 V5.0.0 (Mar. 2002).

(56) References Cited

OTHER PUBLICATIONS

Universal Mobile Telecommunications System (UMTS); "Radio resource management strategies (3GPP TR 25.922 version 5.1.0 Release 5)," ETSI TR 125 922 V5.1.0 (Sep. 2003).
Universal Mobile Telecommunications System (UMTS); "Radio resource management strategies (3GPP TR 25.922 version 6.0.1 Release 6)," ETSI TR 125 922 V6.0.1 (Apr. 2004).

* cited by examiner

SUPPORTING ENHANCED UPLINK TRANSMISSION DURING SOFT HANDOVER

CROSS REFERENCE TO RELATED APPLICATIONS

This application is a continuation of U.S. patent application Ser. No. 15/699,418 filed on Sep. 8, 2017, which is a continuation of U.S. patent application Ser. No. 14/869,313, filed on Sep. 29, 2015, now U.S. Pat. No. 9,763,156 issued on Sep. 12, 2017, which is a continuation of U.S. patent application Ser. No. 13/908,242 filed on Jun. 3, 2013, now U.S. Pat. No. 9,215,636 issued on Dec. 15, 2015, which is a continuation of U.S. patent application Ser. No. 13/308,950 filed on Dec. 1, 2011, now U.S. Pat. No. 8,457,072 issued on Jun. 4, 2013, which is a continuation of U.S. patent application Ser. No. 11/434,330 filed on May 15, 2006, now U.S. Pat. No. 8,130,720 issued on Mar. 6, 2012, which is a continuation of U.S. patent application Ser. No. 10/962,720 filed Oct. 12, 2004, now U.S. Pat. No. 7,046,648 issued on May 16, 2006, which claims the benefit of U.S. Provisional Application Ser. No. 60/578,674 filed Jun. 10, 2004; 60/520,692 filed Nov. 17, 2003; 60/519,990 filed Nov. 14, 2003; and 60/517,656 filed Nov. 5, 2003, all of which are incorporated by reference as if fully set forth.

FIELD OF INVENTION

The present invention is related to a wireless communication system. More particularly, the present invention is related to a method and apparatus for coordinating Node-Bs and supporting enhanced uplink (EU) transmissions during handover.

BACKGROUND

Many schemes have been proposed to improve coverage, throughput, and transmission latency for EU transmissions in third generation partnership project (3GPP). One of the developments is to move the functions for scheduling and assigning uplink (UL) physical channel resources from a radio network controller (RNC) to a Node-B. A Node-B can make more efficient decisions and manage UL radio resources on a short-term basis better than the RNC, even if the RNC retains overall control over Node-Bs. A similar approach has already been adopted in downlink for high speed data packet access (HSDPA) in both universal mobile telecommunication system (UMTS) frequency division duplex (FDD) and time division duplex (TDD) modes.

It has also been recognized that performance is greatly enhanced with the use of medium access control (MAC) level automatic repeat request (ARQ) and hybrid ARQ (H-ARQ). Application of these techniques during soft handover provides additional significant benefits.

FIG. 1 shows a conventional wireless multi-cell communication system 100 including a wireless transmit/receive unit (WTRU) 105, a Node-B 110, an RNC 115, and at least two cells 120A, 120B. Each of the cells 120A, 120B, is served by the Node-B 110. Node-B 110 is controlled by the RNC 115. When a change in the cell offering the best radio conditions is determined between cells 120A and 120B, a handover process is initiated.

An "intra-Node-B handover" occurs when a WTRU changes from one cell to another cell controlled by the same Node-B, as shown in FIG. 1. An "inter-Node-B handover" occurs when a WTRU changes from one cell to another cell controlled by a different Node-B. In the latter case, the Node-B that controls the cell before the handover is called a source Node-B, and the Node-B that controls the cell after the handover is called a target Node-B.

During soft handover, a WTRU establishes a plurality of connections with a plurality of Node-Bs in an active set. In this situation, a problem may arise for scheduling and H-ARQ operation. A WTRU may receive conflicting EU transmission scheduling from more than one Node-B. It is also difficult for the WTRU to receive, decode and process H-ARQ positive and negative acknowledgements (ACKs/NACKs) generated by a plurality of Node-Bs. The soft buffer of an H-ARQ process in Node-Bs may be corrupted during soft handover.

One method to support H-ARQ across multiple Node-Bs, when the WTRU is in soft handover, is to place the ACK/NACK generation function in the RNC, which derives a single ACK/NACK based on the results from the multiple Node-Bs. However, this approach presents a significant delay to the ACK/NACK process, which is highly undesirable for performance reasons.

When a WTRU undergoes an inter-Node-B hard handover, there is a possibility that a source Node-B, which is a Node-B before hard handover is completed, may not successfully receive EU transmissions for data packets that have been NACKed prior to hard handover activation time. Other WTRUs competing for UL resources may not be provided with enough physical resources in the source cell. If data blocks that have been NACKed prior to the handover are retransmitted to the source Node-B before the handover activation timer expires, those data blocks can be combined with the previous data blocks for H-ARQ decoding. In this way, the decoding takes the advantage of previous, although failed, transmissions of those data blocks in the source cell. If data blocks that have been NACKed prior to the handover are not retransmitted to the source Node-B before the handover activation timer is expired, they have to be transmitted again in the target cell as new data blocks. In this case, the previous transmissions of those data blocks in the source cell are not utilized.

SUMMARY

An enhanced uplink user equipment is in soft handover. A radio network controller selects a primary Node-B out of a plurality of Node-Bs supporting the soft handover. The radio network controller receiving successfully received enhanced uplink data packets from the plurality of Node-Bs. The radio network controller reordered the successfully received enhanced uplink data packets for in-sequence deliver. The primary Node-B sends specified scheduling information to the user equipment that the other Node-Bs does not transmit. At least the primary Node-B transmits acknowledgements and negative acknowledgements to the user equipment.

BRIEF DESCRIPTION OF THE DRAWINGS

A more detailed understanding of the invention may be had from the following description, given by way of example and to be understood in conjunction with the accompanying drawings wherein.

DETAILED DESCRIPTION OF THE PREFERRED EMBODIMENTS

Figure 1:
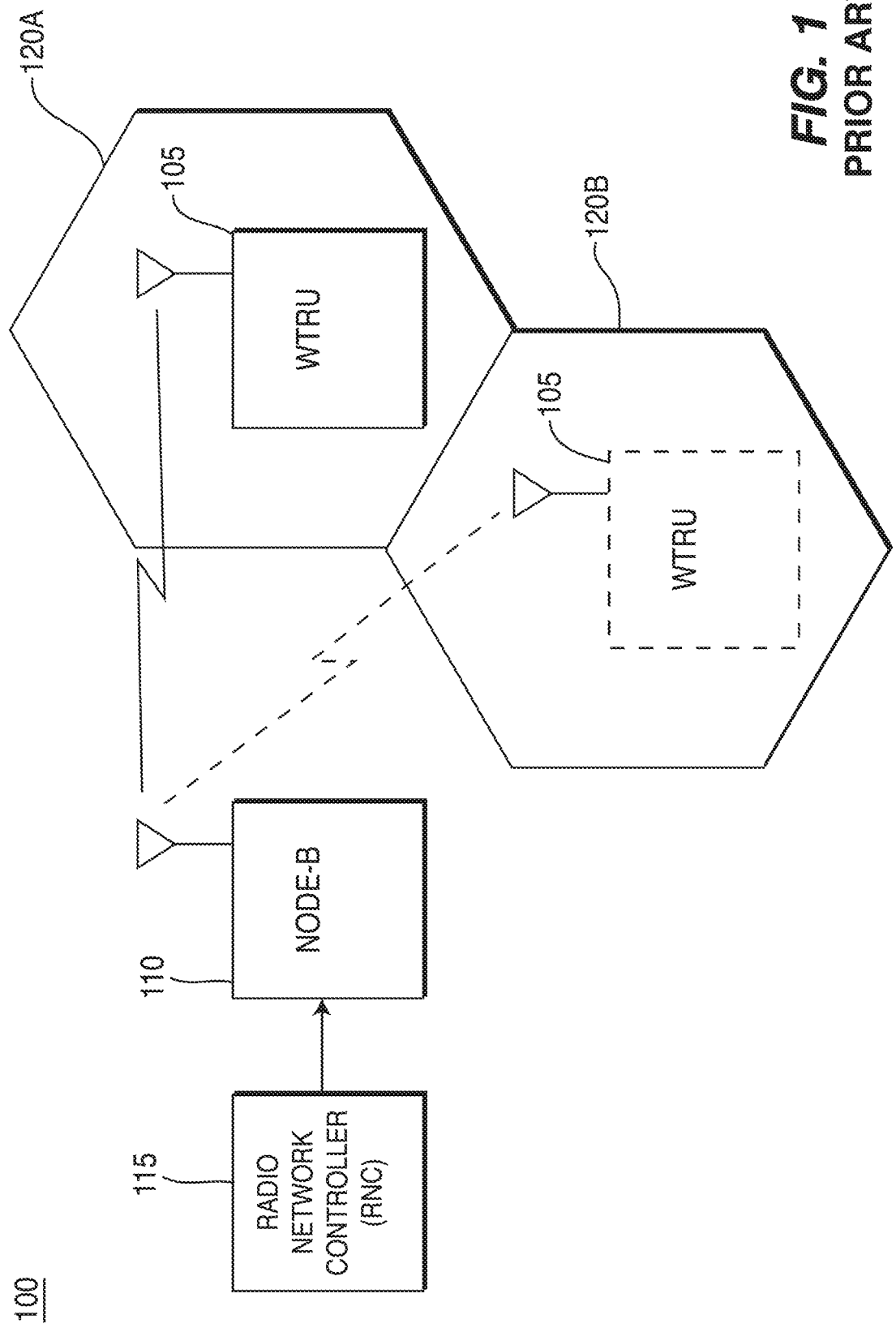
FIG. 1 shows a conventional wireless communication system.

The present invention will be described with reference to the drawing figures wherein like numerals represent like elements throughout.

Hereafter, the terminology "WTRU" includes but is not limited to a user equipment (UE), a mobile station, a fixed or mobile subscriber unit, a pager, or any other type of device capable of operating in a wireless environment.

When referred to hereafter, the terminology "Node-B" includes but is not limited to a base station, a site controller, an access point or any other type of interfacing device in a wireless environment.

The present invention may be implemented in any type of wireless communication systems, such as UMTS-FDD, TDD, time division synchronous code division multiple access (TDSCDMA), code division multiple access 2000 (CDMA2000) (EV-DO and EV-DV) or any other type of wireless communication system.

The features of the present invention may be incorporated into an IC or be configured in a circuit comprising a multitude of interconnecting components.

Figure 2:
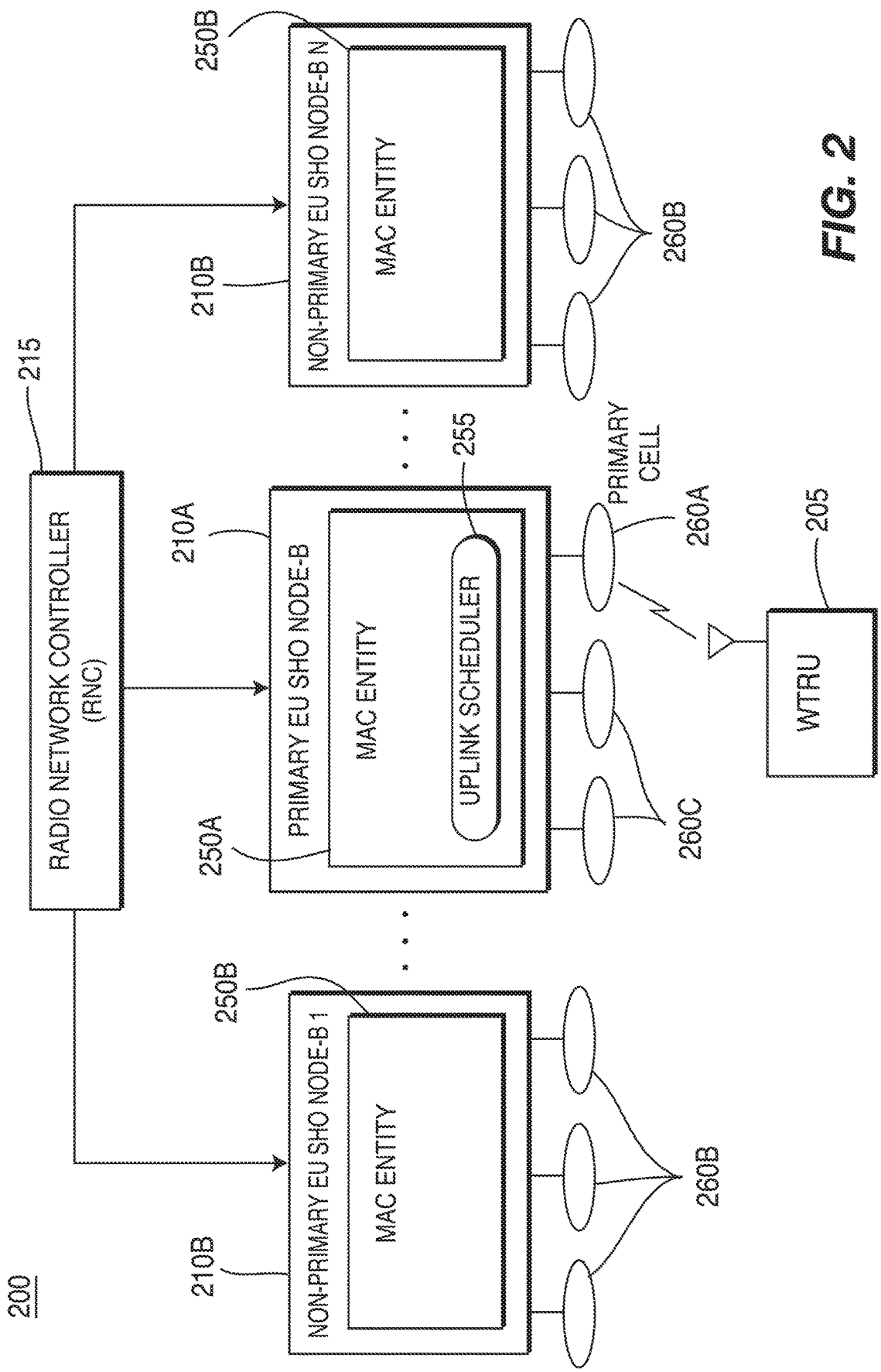
FIG. 2 shows a system which uses a UL scheduler located in a primary Node-B during soft handover for EU in accordance with the present invention.

FIG. 2 shows a wireless multi-cell communication system 200 which uses a UL scheduler located in a primary Node-B in accordance with the present invention. The wireless multi-cell communication system 200 includes a WTRU 205, a plurality of Node-Bs 210 (i.e., 210A, 210B), an RNC 215 and a plurality of cells 260 (i.e., 260A, 260B, 260C). Cells 260A and 260C are served by the Node-B 210A. Cells 260B are served by the Node-Bs 210B. All of the Node-Bs 210 are controlled by the RNC 215.

During soft handover, the WTRU 205 establishes multiple connections with the Node-Bs 210 included in an active set. Each transmission from the WTRU 205 is processed independently at each of the Node-Bs 210. One of the Node-Bs 210 in the active set is designated as a primary Node-B 210A, and the other Node-Bs are designated as non-primary Node-Bs 210B.

As shown in FIG. 2, the primary Node-B 210A includes a MAC entity 250A including a UL scheduler 255. Each of the non-primary Node-Bs 210B also includes a MAC entity 250B. Each of the MAC entities 250A, 250B, handles EU transmissions. The UL scheduler 255 in the MAC entity 250A is responsible for scheduling the EU transmissions.

In accordance with one embodiment of the present invention, the UL scheduler 255 is implemented only at the primary Node-B 210A during soft handover. The WTRU 205 receives a UL transmission schedule only from the primary Node-B 210A in a primary cell 260A. However, the primary Node-B 210A cannot send the scheduling information to the non-primary Node-Bs 210B in every transmission time interval (TTI). In order to allow the primary Node-B 210A to allocate resources for the WTRU 205 to transmit in cells controlled by the non-primary Node-Bs 210B, those resources scheduled by the primary Node-B 250A in a plurality of cells 260B controlled by the non-primary Node-Bs 210B cannot be assigned by the non-primary Node-Bs 210B. Therefore, some physical resources common to all of the cells in the active EU subset should be assigned and reserved by a particular Node-B for the WTRU 205 during the soft handover, so that those resources can be used only by the primary Node-B 210A.

The UL scheduler 255 located in the primary Node-B 210A considers the interference level caused by the EU transmission at any cell 260A, 260B, 260C, in the EU active subset to be below a predetermined maximum allowed interference level. Thus, the primary Node-B 250A limits the transmit power level of the WTRU 205 such that the interference levels are also within the maximum allowed interference levels at other cells 260B, 260C. To achieve this, the RNC 215 needs to relay necessary information, such as transmission power level and interference level, of the cells 260B controlled by the non-primary Node-Bs 210B to the primary Node-B 210A, which then uses the information to schedule the UL transmissions.

The EU scheduling information is transmitted to the WTRU 205 only by the primary Node-B 210A through the primary cell 260A. During soft handover, the WTRU 205 receives EU scheduling information only in the primary cell 260A, although the EU scheduling information is valid in all other cells 260B, 260C.

In one embodiment, the primary Node-B 250A is selected by either the RNC 215 or the WTRU 205. The RNC 215 may choose a Node-B that has the highest percentage of correctly received data blocks during a predefined time window as a primary Node-B.

In another embodiment, the RNC 215 generates statistics for each Node-B, such as a bit error rate (BER) or a frame error rate (FER), or the like, over a predetermined time period. Then, the RNC 215 may select a Node-B having the best performance to be the primary Node-B 210A. The RNC 215 then notifies the WTRU 205 and all other Node-Bs about the primary Node-B 210A via radio resource control (RRC) and Iub signaling, respectively.

In another embodiment, the WTRU 102 may choose a Node-B 210 that has the best downlink pilot power, (i.e., best downlink path loss or highest code power), as a primary Node-B 210A. The WTRU 205 measures the power of pilot signals received from all Node-Bs 210 and selects the Node-B 210 having the highest pilot power to be the primary Node-B 210A. The WTRU 205 then notifies all other Node-Bs about the primary Node-B 210A via fast physical layer signaling.

The WTRU 205 may report the downlink pilot power of all cells 260 to the RNC 215. The RNC 215 then chooses one Node-B 210 to be the primary Node-B 210a based on the combined uplink and downlink quality. The uplink quality of a cell 260 based on the percentage of correctly received data blocks, (or BER, FER, or the like), during a predefined time window, and the downlink quality of a cell 260 is based on the WTRU received downlink pilot power. Then, the RNC 215 notifies the WTRU 205 and all of the Node-Bs 210 about the primary Node-B 210A via RRC and Iub signaling, respectively.

The present invention is advantageous over prior art systems. Using the present invention, a WTRU does not receive conflicting scheduling of EU transmissions from Node-Bs during soft handover. In addition, EU transmission is scheduled in consideration of an interference level and radio resources in cells controlled by non-primary Node-Bs. Signaling delay from the primary Node-B 210A to the WTRU 205 is much lower as compared to signaling delay from the RNC 215 to the WTRU 205.

Figure 3:
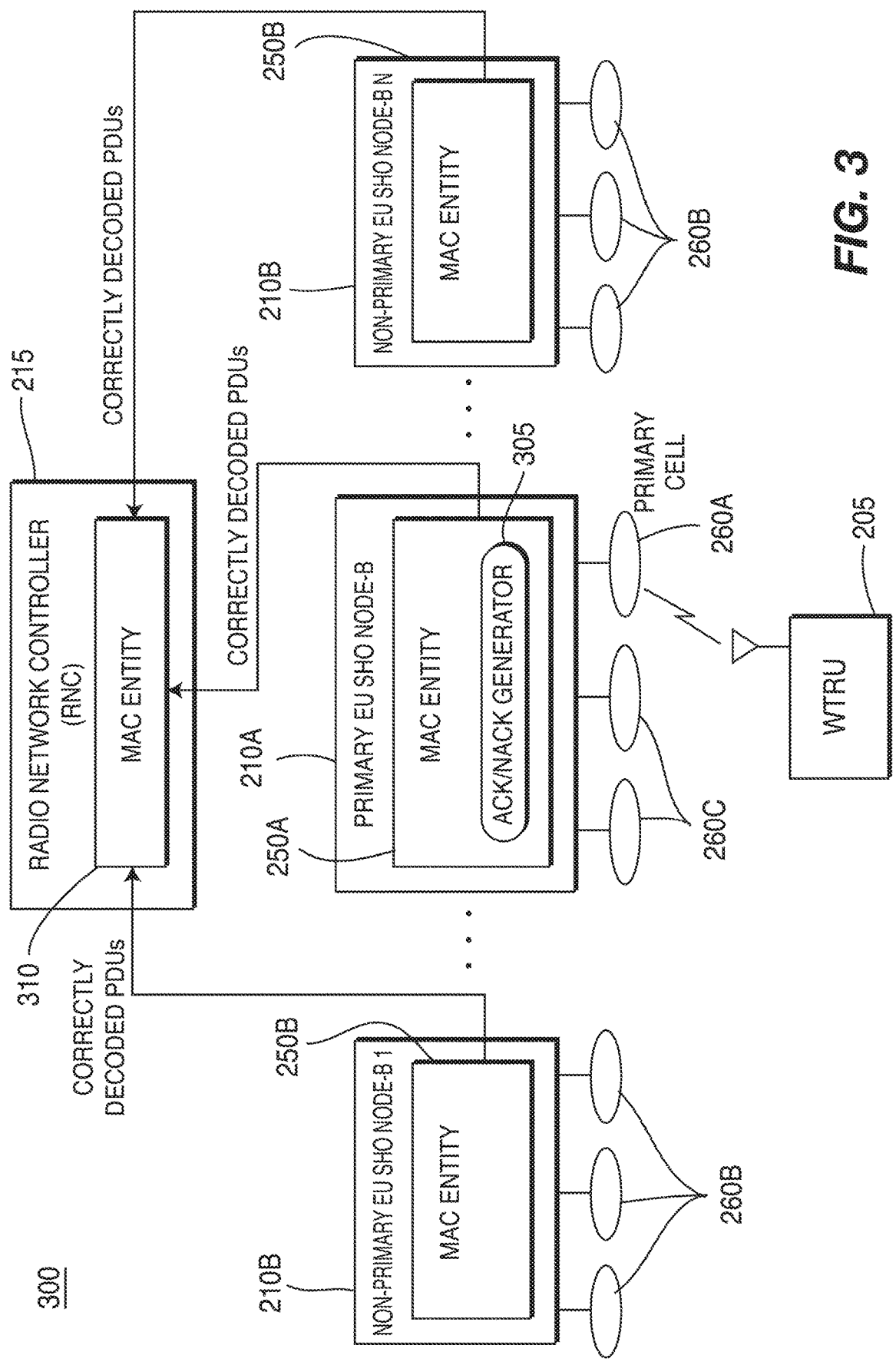
FIG. 3 shows a system which uses an ACK/NACK generation function located in a primary Node-B during soft handover for EU in accordance with the present invention.

In a separate embodiment, FIG. 3 shows a wireless multi-cell communication system 300, similar to the system 200 shown in FIG. 2. As shown in FIG. 3, the primary Node-B 210A includes a MAC entity 250A including an ACK/NACK generator 305. Only the primary Node-B 210A has the ACK/NACK generator 305. The primary Node-B 210A may perform H-ARQ with incremental redundancy, or only ARQ without implementing incremental redundancy.

Still referring to FIG. 3, the primary Node-B 210A receives at least one data packet from the WTRU 205 through the primary cell 260A and performs an error check on the data packet. Any error checking method, such as a cyclic redundancy check (CRC), may be utilized. If the primary Node-B 210A correctly decodes the data packet, such as passing the CRC, the primary Node-B 210A transmits an ACK to the WTRU 205 and also transmits the correctly decoded data packet to the RNC 215. If the primary Node-B 210A fails to correctly decode the data packet, the primary Node-B 210A transmits a NACK to the WTRU 205.

The non-primary Node-Bs 210B also perform an error check on the data packet. However, the non-primary Node-Bs 210B do not send ACKs or NACKs to the WTRU 205. Instead, the non-primary Node-Bs send successfully decoded data packets to the RNC 215. During soft handover, only the primary Node-B 210A generates H-ARQ (or ARQ), ACKs and NACKs, and controls retransmissions.

The MAC layer WTRU identities received by the non-primary Node-Bs 210B may be used for routing of successfully received transmissions in a universal terrestrial radio access network (UTRAN). Since the non-primary Node-Bs 210B are not aware of which WTRUs have been scheduled for EU transmission by the primary Node-B 210A, the non-primary Node-Bs 210B may rely on in-band MAC layer signaling of the WTRU ID to route correctly received transmissions to the correct RNC radio link. Even though the primary Node-B 210A may be aware of which WTRU is scheduled, the same method may be implemented by the primary Node-B 210A.

Preferably, the primary Node-B 210A may use soft combining to process transmissions, while the non-primary Node-Bs 210B may process each transmission without soft combining. If the primary Node-B sends a NACK to the WTRU 205, the NACKed data packet is stored in a buffer of the primary Node-B 210A, and the NACKed data packet is combined with a retransmitted data packet. In contrast, the non-primary Node-Bs 210B do not store the NACKed data packets. This eliminates the problem of soft buffer corruption between the Node-Bs 210, and the complexities of multiple independent ACKs and/or NACKs.

When an incremental combining process is implemented, measures should be taken to avoid soft buffer corruption. Sequence information or a new data indicator is required to enable a Node-B 210 to detect that the WTRU 205 is no longer repeating data for a particular WTRU H-ARQ process, but instead is sending new data. This is specifically required because the Node-B 210 has no other way to learn that a new transmission has started. Alternatively, the non-primary Node-Bs 210B may simply perform an ARQ, without using an incremental combining process. This eliminates the soft buffer corruption problem.

In the case where non-primary Node-Bs 210B perform simple ARQ without incremental combining, the WTRU 205 must transmit self-decodable data packets to ensure that all of the Node-Bs 210 may decode transmissions, regardless of the result of earlier transmissions. Preferably, the H-ARQ functionality is terminated at the Node-Bs 210. Each of the Node-Bs 210 sends to the RNC 215 successfully decoded data packets with explicit identification of transmission, such as a transmission sequence number (TSN). The RNC 215 may optionally use data packets delivered from the non-primary Node-Bs 210B. A MAC entity 310, located in the RNC 215, is used to implement an in-sequence delivery process for delivering data to higher layers over all of the packets received from the Node-Bs 210. After the RNC MAC entity 310 has completed its re-ordering process, it sends the data to a radio link control (RLC) (not shown). Missed packets are identified at the RNC 215 and the WTRU 205 is informed through RLC messaging.

Alternatively, EU transmissions may identify WTRU ID, H-ARQ process, transmission sequence and/or new data indication (NDI) to allow for soft combining in the non-primary Node-B's 210B. If this method is used to allow soft combining in the non-primary Node-Bs 210B, the primary Node-B 210A may not have to rely on scheduling and H-ARQ ACK/NACK decisions to determine when combining should be performed.

There are two options for the transmission of ACK/NACK messages. The first option is a synchronous transmission. The ACK/NACK messages are transmitted after a unique time delay with respect to the corresponding uplink transmission or the EU channel allocation message. The second option is an asynchronous transmission. There is no unique delay between the transmission of ACK/NACK messages and the corresponding uplink transmission or the EU channel allocation message. Explicit information in the ACK/NACK message identifies the corresponding uplink transmission to enable the WTRU 205 to make the correct association between the ACK/NACK message and the transmission. This association is made by either identifying the H-ARQ process number and/or a unique sequence number, such as a TSN with each ACK/NACK feedback message to the WTRU 205.

In a separate embodiment, preferably implemented for the asynchronous ACK/NACK feedback case, the non-primary Node-Bs 210B may provide H-ARQ ACK/NACK results to the primary Node-B 210A in order to avoid unnecessary retransmissions for transmissions that are not correctly received by the primary Node-B 210A, but are correctly received by the non-primary Node-Bs 210B. A non-primary Node-B 210B does not directly send an ACK or NACK message to the WTRU 205. The non-primary Node-Bs 210B sends ACK/NACK or CRC results to the RNC 215. Then, the RNC 215 sends ACK or CRC results to the primary Node-B 210A.

In order to speed up H-ARQ processing, the first ACK message from any non-primary Node-B 210B received by the RNC is preferably immediately forwarded to the primary Node-B 210A. The primary Node-B 210A also immediately generates an ACK message if the transmission is received correctly in the primary Node-B 210A without waiting for feedback from the non-primary Node-Bs 210B. The primary Node-B 210A also generates an ACK message immediately upon reception of a forwarded ACK message from the RNC, even if other ACK messages may be forwarded. Since an ACK is generated if any of the paths are successful, an ACK can be generated as soon as the first successful transmission is found.

Alternatively, in order to simplify the design of the ACK/NACK generator 205, only a subset of the generating nodes may be used. For example, ACKs may be generated only at the RNC, or at the RNC and the primary Node-B 210A.

When the WTRU 205 sends an uplink transmission, for each H-ARQ process the WTRU 205 waits at least the time required for the primary Node-B 210A to send ACK/NACK feedback. For each H-ARQ process, if an ACK is received by the WTRU 205, the WTRU 205 may send new data in the next available or assigned opportunity.

A NACK message can only originate in the RNC 215 since it is the only node that has all of the information necessary in the soft handover to determine that there have been no successful receptions at any Node-B 210. The RNC 215 generates a NACK command if the RNC 215 receives no ACK from the Node-Bs 210 within a predetermined time interval. The RNC 215 forwards the NACK message to the WTRU 205 via the primary Node-B 210A.

It is also possible that this procedure can be implemented without an explicit NACK command. In this case, the lack of ACK reception within a particular period of time is considered the same as an explicit NACK command at either the primary Node-B 210A and/or the WTRU 205.

Figure 4:
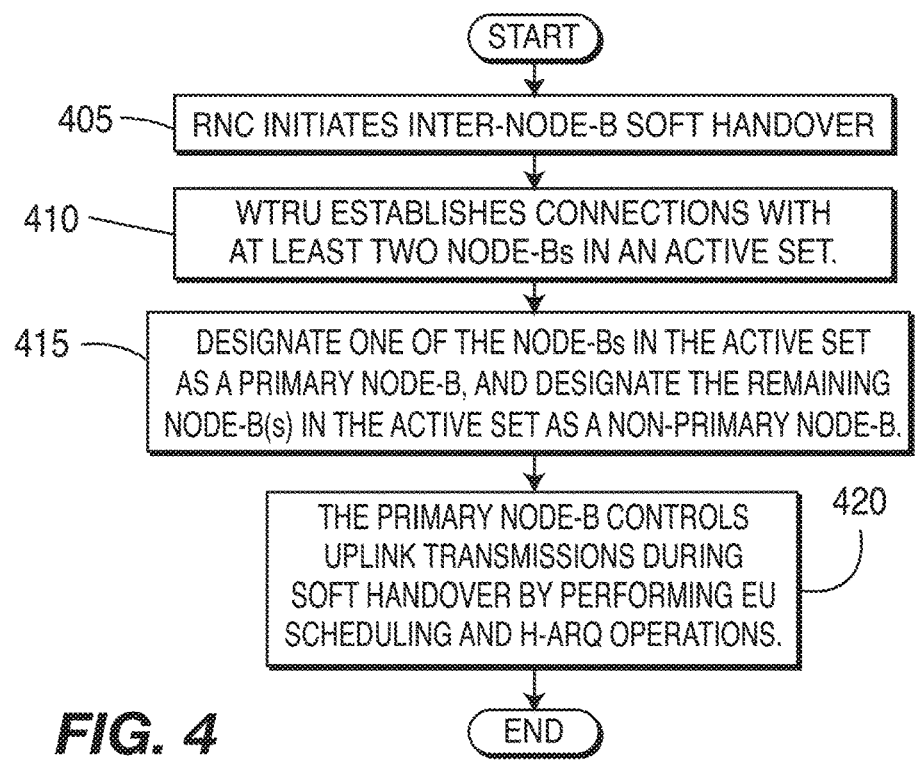
FIG. 4 is a flowchart of a process including method steps for coordinating Node-Bs during soft handover in accordance with one embodiment of the present invention.

FIG. 4 is a flowchart of a process 400 including method steps for coordinating Node-Bs during soft handover in accordance with one embodiment of the present invention. In step 405, the RNC 215 makes a decision to initiate an inter-Node-B soft handover. In step 410, the WTRU 205 establishes connections with at least two Node-Bs 210 in an active set. In step 415, one of the Node-Bs 210 in the active set is designated as a primary Node-B 210A and the one or more Node-B(s) 210 remaining in the active set are designated as a non-primary Node-Bs 210B. In step 420, the primary Node-B 210A controls UL transmissions during soft handover by performing EU scheduling and H-ARQ operations.

Figure 5:
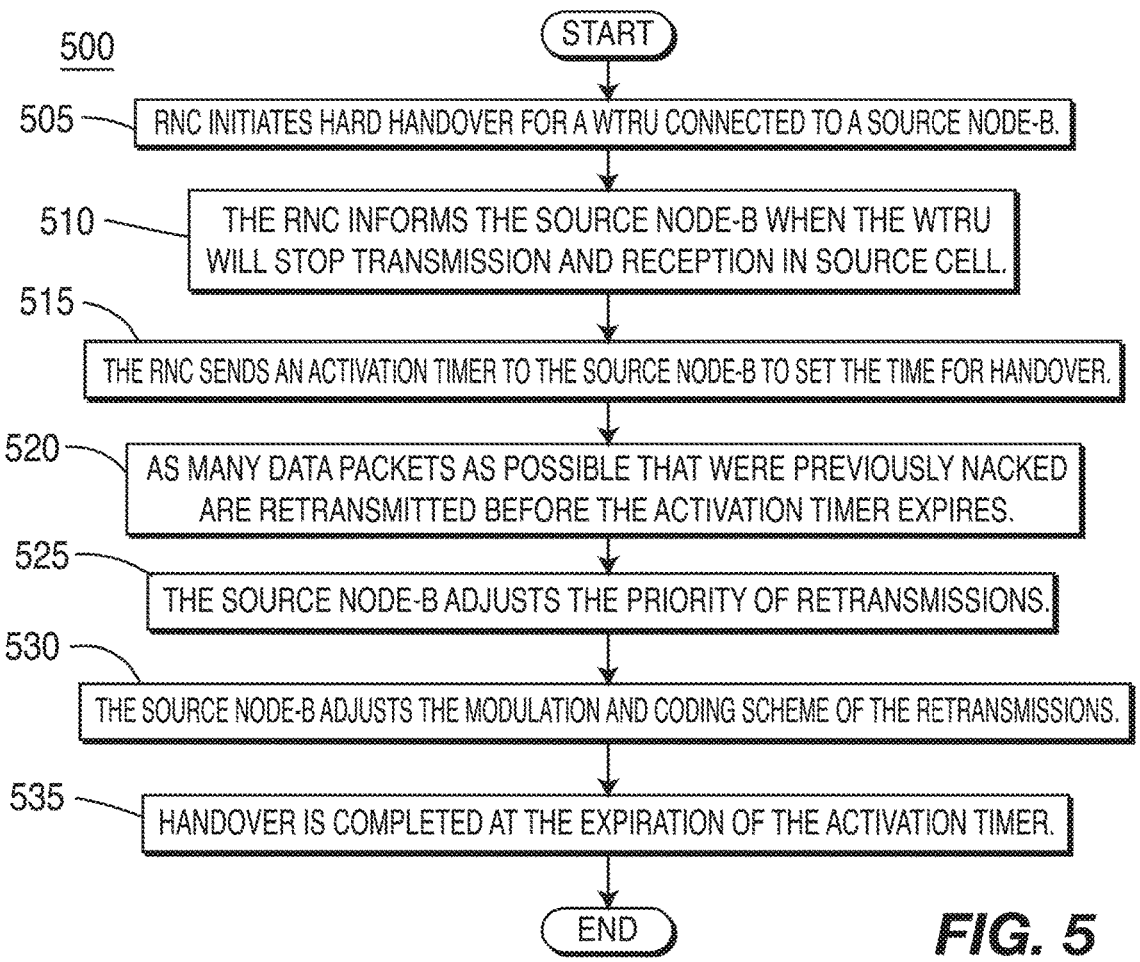
FIG. 5 is a flowchart of a process including method steps for prioritizing the transmission of NACKed data in a source Node-B before hard handover is completed in accordance with a separate embodiment of the present invention.

FIG. 5 is a flowchart of a process 500 including method steps for prioritizing the transmission of NACKed data in a source Node-B before hard handover is completed in accordance with a separate embodiment of the present invention. In step 505, the RNC 215 makes a decision to initiate a hard handover for a WTRU 205 connected to a source Node-B 210. In step 510, the RNC 215 informs the source Node-B 210 when the WTRU 205 will stop transmission and reception in the source cell 260. In step 515, the RNC 215 sends an activation timer to the source Node-B 210 to set the time for handover.

Still referring to FIG. 5, if the source Node-B 210 determines that there are data packets that were previously NACKed, as many previously NACKed data packets as possible should be retransmitted before the handover activation timer expires. Otherwise, the system may lose the benefit of incrementally combining the previous transmission with the retransmission. Therefore, the source Node-B scheduler 255 takes the handover activation time into account when it schedules the data packets that have been NACKed. If there is not enough radio resource for the source Node-B 210 to schedule transmission of all the NACKed data packets in time, the source Node-B 210 should manage to schedule transmission of as many NACKed data packets as possible.

Still referring to FIG. 5, in order to transmit as many NACKed data packets as possible before the activation timer expires, the source Node-B 210 adjusts the priority of transmissions (step 525) and, in step 530, the source node-B 210 adjusts the MCS of the transmissions (step 530). Higher priority of scheduling is given to the data packets that have been NACKed. If the radio resources are sufficient, a more robust MCS may be used to increase the probability of successful transmissions from the WTRU 205 to the source Node-B 210. In step 535, the handover is completed at the expiration of the activation timer.

In order for the WTRU 205 to understand that the scheduled uplink transmission is intended for data blocks with previous transmission failures, the source Node-B 210 uplink scheduler 255 may specify that the scheduled UL transmission is intended for the data blocks that were previously NACKed. This may be implemented by including H-ARQ process identification in the UL scheduling information that is sent from the source Node-B 210 to the WTRU 205. By receiving the scheduling information from the source Node-B 210, the WTRU 205 knows that the scheduled transmission is for specific data associated with HARQ process identification sent together with the scheduling information.

While this invention has been particularly shown and described with reference to preferred embodiments, it will be understood by those skilled in the art that various changes in forms and details may be made therein without departing from the scope of the invention as described above.

What is claimed is:

1. A method for communicating by a wireless transmit/receive unit (WTRU) during a handover process between a primary cell and a non-primary cell, the method comprising:
receiving scheduling information from the primary cell;
transmitting, via the primary cell and the non-primary cell, enhanced uplink (EU) data according to the scheduling information, wherein the WTRU transmits the EU data using uplink resources specified for the WTRU in the scheduling information and such that a level of interference at the primary cell and a level of interference at the non-primary cell are controlled;
processing hybrid automatic repeat request (HARQ) acknowledgements (ACKs) from the primary cell; and
processing negative acknowledgements (NACKs) from the primary cell and not from the non-primary cell.

2. The method of claim 1, further comprising:
receiving an identifier indicating the primary cell and the non-primary cell.

3. The method of claim 1, further comprising:
transmitting downlink power measurements of transmissions received by the WTRU.

4. The method of claim 1, wherein the EU data includes identification information of the WTRU.

5. The method of claim 1, wherein the scheduling information includes any one or a combination of a HARQ process identification and a transmit power level of the WTRU.

6. The method of claim 1, further comprising:
transmitting the EU data using synchronous HARQ.

7. The method of claim 1, wherein the EU data is transmitted in accordance with the received scheduling information.

8. The method of claim 1, further comprising:
retransmitting the EU data from the WTRU via the primary cell and the non-primary cell upon receipt of a NACK.

9. The method of claim 1, wherein the handover process is a soft handover.

10. The method of claim 1, wherein the interference level at the primary cell and the interference level at the non-primary cell are controlled such that the interference level at the primary cell is below a predetermined interference level for the primary cell and the interference level at the non-primary cell is below a predetermined interference level for the non-primary cell.

11. A wireless network comprising a plurality of Node-Bs configured to communicate with a wireless transmit/receiver unit (WTRU) during a handover process between a first Node-B of the plurality of Node-Bs and a second Node-B of the plurality of Node-Bs by:
   transmitting scheduling information to the WTRU via the first Node-B;
   receiving enhanced uplink (EU) data from the WTRU at the first Node-B and the second Node-B according to the scheduling information, wherein the EU data is received using uplink resources specified for the WTRU in the scheduling information and such that a level of interference at the first Node-B and a level of interference at the second Node-B are controlled;
   transmitting hybrid automatic repeat request (HARQ) acknowledgements (ACKs) to the WTRU via the first Node-B; and
   transmitting negative acknowledgements (NACKs) to the WTRU via the first Node-B and not via the second Node-B.

12. The wireless network of claim 11, wherein the first Node-B controls a primary cell and the second Node-B controls a non-primary cell.

13. The wireless network of claim 11, further comprising:
   a radio network controller (RNC) to transmit to the plurality of Node-Bs an identifier indicating the first Node-B and the second Node-B.

14. The wireless network of claim 11, wherein the plurality of Node-Bs is further configured to receive, from the WTRU, downlink power measurements of transmissions received by the WTRU.

15. The wireless network of claim 11, wherein the EU data includes identification information of the WTRU.

16. The wireless network of claim 11, wherein the scheduling information includes any one or a combination of a HARQ process identification and a transmit power level of the WTRU.

17. The wireless network of claim 11, wherein the first and second Node-Bs are further configured to receive the EU data using synchronous HARQ.

18. The wireless network of claim 11, wherein the handover process is a soft handover.

19. The wireless network of claim 11, wherein the interference level at the primary cell and the interference level at the non-primary cell are controlled such that the interference level at the primary cell is below a predetermined interference level for the primary cell and the interference level at the non-primary cell is below a predetermined interference level for the non-primary cell.

20. A Node B comprising:
   at least one transceiver; and
   a processor;
   wherein, when the Node B is performing an intra-Node B handover process for a wireless transmit/receive unit (WTRU) between a primary cell and a non-primary cell, the processor causes the at least one transceiver to:
      transmit, via the primary cell, scheduling information to the WTRU to schedule enhanced uplink (EU) data transmissions from the WTRU,
      receive, at the primary cell and the non-primary cell, EU data transmissions from the WTRU, wherein the EU data transmissions from the WTRU are received using uplink resources specified for the WTRU in the scheduling information and such that a level of interference at the primary cell and a level of interference at the non-primary cell are controlled,
      transmit, via the primary cell, hybrid automatic repeat request (HARQ) acknowledgements (ACKs) to the WTRU, and
      transmit, via the primary cell but not via the non-primary cell, negative acknowledgements (NACKs) to the WTRU.

21. The Node B of claim 20, wherein the transceiver is configured to process an identifier indicating the primary cell and the non-primary cell.

22. The Node B of claim 20, wherein the transceiver is configured to receive downlink power measurements of transmissions transmitted by the transceiver.

23. The Node B of claim 20, wherein the EU data includes identification information of the WTRU.

24. The Node B of claim 20, wherein the scheduling information includes any one or a combination of a HARQ process identification and a transmit power level.

25. The Node B of claim 20, wherein the transceiver receives the EU data using synchronous HARQ.

26. The Node B of claim 20, wherein the transceiver receives the EU data in accordance with the transmitted scheduling information.

27. The Node B of claim 20, wherein the EU data transmissions are scheduled to control interference at the primary cell and at the non-primary cell.

28. The Node-B of claim 20, wherein the interference level at the primary cell and the interference level at the non-primary cell are controlled such that the interference level at the primary cell is below a predetermined interference level for the primary cell and the interference level at the non-primary cell is below a predetermined interference level for the non-primary cell.

29. A wireless communication system comprising:
   a wireless transmit/receiver unit (WTRU); and
   a wireless network including a primary cell and a non-primary cell, the primary cell and the non-primary cell being associated with a Node-B,
   wherein, during a handover process between the primary cell and the non-primary cell,
      the Node-B is configured to transmit scheduling information to the WTRU via the primary cell to schedule enhanced uplink (EU) data transmissions from the WTRU,
      the WTRU is configured to transmit EU data to the Node-B via the primary cell and the non-primary cell, wherein the WTRU transmits the EU data using uplink resources specified for the WTRU in the scheduling information and such that a level of interference at the primary cell and a level of interference at the non-primary cell are controlled,
      the Node-B is configured to receive, via the primary cell and the non-primary cell, EU data transmissions from the WTRU according to the scheduling information,
      the Node-B is configured to transmit hybrid automatic repeat request (HARQ) acknowledgements (ACKs) via the primary cell, and
      the Node-B is configured to transmit negative acknowledgements (NACKs) via the primary cell and to not transmit the NACKs via the non-primary cell.

30. The wireless communication system of claim 29, wherein the Node-B is further configured to receive, from the WTRU, downlink power measurements of transmissions received by the WTRU.

31. The wireless communication system of claim 29, wherein the EU data includes identification information of the WTRU.

32. The wireless communication system of claim 29, wherein the scheduling information includes any one or a combination of a HARQ process identification and a transmit power level of the WTRU.

33. The wireless communication system of claim 29, wherein the interference level at the primary cell and the interference level at the non-primary cell are controlled such that the interference level at the primary cell is below a predetermined interference level for the primary cell and the interference level at the non-primary cell is below a predetermined interference level for the non-primary cell.

34. A wireless transmit/receive unit (WTRU) comprising:
at least one transceiver; and
a processor,
wherein, during a handover process between a primary cell and a non-primary cell, the processor is configured to cause the at least one transceiver to:
receive scheduling information from the primary cell;
transmit, via the primary cell and the non-primary cell, enhanced uplink (EU) data according to the scheduling information, wherein the EU data is transmitted using uplink resources specified for the WTRU in the scheduling information and such that a level of interference at the primary cell and a level of interference at the non-primary cell are controlled;
process hybrid automatic repeat request (HARQ) acknowledgements (ACKs) from the primary cell; and
process negative acknowledgements (NACKs) from the primary cell and not from the non-primary cell.

35. The WTRU of claim 34, wherein the processor is further configured to cause the at least one transceiver to receive an identifier indicating the primary cell and the non-primary cell.

36. The WTRU of claim 34, wherein the processor is further configured to cause the at least one transceiver to transmit downlink power measurements of transmissions received by the WTRU.

37. The WTRU of claim 34, wherein the EU data includes identification information of the WTRU.

38. The WTRU of claim 34, wherein the scheduling information includes any one or a combination of a HARQ process identification and a transmit power level of the WTRU.

39. The WTRU of claim 34, wherein the processor is further configured to cause the at least one transceiver to transmit the EU data using synchronous HARQ.

40. The WTRU of claim 34, wherein the processor is further configured to cause the at least one transceiver to transmit the EU data in accordance with the received scheduling information.

41. The WTRU of claim 34, wherein the processor is further configured to cause the at least one transceiver to retransmit the EU data from the WTRU via the primary cell and the non-primary cell upon receipt of a NACK.

42. The WTRU of claim 34, wherein the handover process is a soft handover.

43. The WTRU of claim 34, wherein the interference level at the primary cell and the interference level at the non-primary cell are controlled such that the interference level at the primary cell is below a predetermined interference level for the primary cell and the interference level at the non-primary cell is below a predetermined interference level for the non-primary cell.

* * * * *